(12) United States Patent
Tyrell

(10) Patent No.: US 7,163,577 B2
(45) Date of Patent: Jan. 16, 2007

(54) BLACK PIGMENTED INK-JET INKS WITH IMPROVED FREQUENCY RESPONSE

(75) Inventor: Paul Tyrell, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/791,007

(22) Filed: Mar. 1, 2004

(65) Prior Publication Data

US 2005/0190244 A1   Sep. 1, 2005

(51) Int. Cl.
*C09D 11/02* (2006.01)
*G01D 11/00* (2006.01)

(52) U.S. Cl. ............... 106/31.86; 106/31.65; 106/31.75; 347/100

(58) Field of Classification Search ........... 106/31.86, 106/31.65, 31.75; 347/100
See application file for complete search history.

(56) References Cited

U.S. PATENT DOCUMENTS

| | | | |
|---|---|---|---|
| 5,356,464 A | | 10/1994 | Hickman et al. |
| 5,571,311 A | * | 11/1996 | Belmont et al. ......... 106/31.28 |
| 5,772,742 A | | 6/1998 | Wang |
| 5,946,012 A | * | 8/1999 | Courian et al. ........... 347/63 |
| 6,177,498 B1 | * | 1/2001 | Rehman ................ 524/388 |
| 6,187,086 B1 | | 2/2001 | Rehman |
| 6,261,350 B1 | | 7/2001 | Kabalnov |
| 6,270,201 B1 | * | 8/2001 | Kasperchik et al. ......... 347/65 |
| 6,379,443 B1 | * | 4/2002 | Komatsu et al. ......... 106/31.58 |
| 6,497,479 B1 | | 12/2002 | Stoffel et al. |
| 6,602,335 B1 | | 8/2003 | Moffatt et al. |
| 6,616,273 B1 | | 9/2003 | Bruinsma |
| 2003/0020796 A1 | | 1/2003 | Stoffel et al. |
| 2003/0218662 A1 | | 11/2003 | Kinomoto et al. |

FOREIGN PATENT DOCUMENTS

EP        1 029 903 A1    8/2000
WO       WO 02/102906    12/2002

* cited by examiner

*Primary Examiner*—J. A. Lorengo
*Assistant Examiner*—Veronica Faison-Gee

(57) ABSTRACT

Compositions, systems, and methods method of rapidly printing a black ink-jet image are provided. The composition can include a liquid vehicle including water, and from 15 wt % to 30 wt % organic solvent, wherein from 3 wt % to 10 wt % of the organic solvent is a methylated pentanetriol co-solvent; and from 1 wt % to 6 wt % of a dispersant-functionalized black carbon pigment. Obtaining firing frequencies from 15 kHz to 25 kHz are feasible with such compositions, provided the ink-jet architecture used with these pens is capable of firing at these very rapid rates.

27 Claims, No Drawings

BLACK PIGMENTED INK-JET INKS WITH IMPROVED FREQUENCY RESPONSE

FIELD OF THE INVENTION

The present invention relates generally to ink-jet ink compositions. More particularly, the present invention relates to pigment-based ink-jet inks that exhibit improved frequency response when jetted from ink-jet architecture.

BACKGROUND OF THE INVENTION

There are several reasons that ink-jet printing has become a popular way of recording images on various media surfaces, particularly paper. Some of these reasons include low printer noise, capability of high-speed recording, and multi-color recording. Additionally, these advantages can be obtained at a relatively low price to consumers. Though there has been great improvement in ink-jet printing, accompanying this improvement are increased demands by consumers in this area, e.g., higher speeds, higher resolution, full color image formation, increased stability, etc. As new ink-jet inks are developed, there have been several traditional characteristics to consider when evaluating the ink in conjunction with a printing surface or substrate. Such characteristics include edge acuity and optical density of the image on the surface, black to color bleed control, dry time of the ink on the substrate, adhesion to the substrate, lack of deviation in ink droplet placement, presence of all dots, resistance of the ink after drying to water and other solvents, long term storage stability, and long term reliability without corrosion or nozzle clogging. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements.

One characteristic of ink-jet printing systems that is desirable to achieve is related to frequency response of the ink-jet ink, which is often proportional to ink throughput. With respect to this aspect, obtaining increased printing speed while retaining acceptable print quality is a constant challenge in the ink-jet printing industry. Accordingly, investigations continue into developing ink formulations that can be printed accurately at high frequencies.

SUMMARY OF THE INVENTION

It has been recognized that it would be advantageous to develop pigment-based ink compositions which have improved frequency response. In one aspect of the present invention, a system for printing images on a substrate can comprise a black ink-jet ink including a liquid vehicle and a dispersant-functionalized black carbon pigment, and a printhead configured to jet the black ink-jet ink at a firing frequency from 15 kHz to 25 kHz. The liquid vehicle can include water, and from 15 wt % to 30 wt % organic solvent, wherein from 3 wt % to 10 wt % of the organic solvent is a methylated pentanetriol co-solvent. The dispersant-functionalized black carbon pigment can be present in the ink composition at from 1 wt % to 6 wt %.

A method of rapidly printing a black ink-jet image can comprise ink-jetting a black ink-jet ink onto a media substrate at a firing frequency from 15 kHz to 25 kHz. The black ink-jet ink can include a liquid vehicle including water, and from 15 wt % to 30 wt % organic solvent, wherein from 3 wt % to 10 wt % of the organic solvent is a methylated pentanetriol co-solvent. The dispersant-functionalized black carbon pigment can be present in the ink at from 1 wt % to 6 wt %.

In another embodiment, an ink-jet ink composition can comprise a liquid vehicle, a dispersant-functionalized black carbon pigment, and an ammonium salt. The liquid vehicle can include from 15 wt % to 30 wt % organic solvent, wherein from 3 wt % to 10 wt % of the organic solvent is a 3-methyl-1,3,5-pentanetriol. From 1 wt % to 6 wt % of the dispersant-functionalized black carbon pigment, and from 0.1 wt % to 4 wt % of an ammonium salt can each be present in the composition as well.

Additional features and advantages of the invention will be apparent from the detailed description which illustrates, by way of example, features of the invention.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a pigment" includes reference to one or more of such materials.

As used herein, "liquid vehicle" is defined to include liquid compositions that can be used to carry colorants, including pigments, to a substrate. Liquid vehicles are well known in the art, and a wide variety of ink vehicles may be used in accordance with embodiments of the present invention. Such ink vehicles may include a mixture of a variety of different agents, including without limitation, surfactants, solvents, co-solvents, buffers, biocides, viscosity modifiers, sequestering agents, stabilizing agents, and water. Though not part of the liquid vehicle per se, in the system and method embodiments, the liquid vehicle can carry solid additives such as polymers, UV curable materials, plasticizers, salts, etc.

As used herein, "pigment" refers to a colorant particle which is typically substantially insoluble in the liquid vehicle in which it is used.

"Self-dispersed pigment," "dispersant-functionalized pigment," or a derivation thereof refers to pigments that have been functionalized with dispersing agent, such as by chemical attachment of the dispersing agent to the surface of the pigment. Dispersing agent can be attached to such pigments to terminate the outer shell of the pigment with a charge, thereby creating a repulsive nature that reduces agglomeration of pigment particles within the liquid vehicle.

"Frequency response" refers to the performance of ink-jet ink and ink-jet architecture used in combination with respect to ink-jet ink firing speed, i.e., dots fired per unit of time. Generally, a higher nozzle firing frequency tends to result in poorer print performance. This can result in misdirected ink drops and other undesirable characteristics. By current standards, firing frequencies above about 12 kHz are considered to be fast printing frequencies.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

As used herein, "bleed" refers to the tendency of ink to run into and mix with adjacently printed inks. "Feathering" refers to the tendency of ink to spread undesirably into unprinted areas of the media substrate. Bleed and feathering typically occur prior to the printed inks fully drying on a substrate. The degree of bleed will depend on a variety of factors such as the drying speed of the ink, agglomeration of the colorant, ink chemistry in general, among other variables.

"Edge acuity" refers to the crispness of a printed image along the border of the image.

The term "about" when referring to a numerical value or range is intended to encompass the values resulting from experimental error that can occur when taking measurements.

In accordance with the present invention, a system for printing images on a substrate is also provided and can comprise a black ink-jet ink including a liquid vehicle and a dispersant-functionalized black carbon pigment, and a printhead configured to jet the black ink-jet ink at a firing frequency from 15 kHz to 25 kHz. The ink-jet architecture preferably can also print the ink-jet ink at more typical lower frequencies, e.g., 3 kHz to 12 kHz, and at moderately high frequencies such as from 12 kHz to 15 kHz. The liquid vehicle can include water, and from 15 wt % to 30 wt % organic solvent, wherein from 3 wt % to 10 wt % of the organic solvent is a methylated pentanetriol co-solvent. The dispersant-functionalized black carbon pigment can be present in the ink composition at from 1 wt % to 6 wt %.

Additionally, a method of rapidly printing a black ink-jet image can comprise ink-jetting a black ink-jet ink onto a media substrate at a firing frequency from 15 kHz to 25 kHz. The black ink-jet ink can include a liquid vehicle including water, and from 15 wt % to 30 wt % organic solvent, wherein from 3 wt % to 10 wt % of the organic solvent is a methylated pentanetriol co-solvent. The dispersant-functionalized black carbon pigment can be present in the ink at from 1 wt % to 6 wt %.

In another embodiment, an ink-jet ink composition can comprise a liquid vehicle having from 15 wt % to 30 wt % organic solvent, wherein from 3 wt % to 10 wt % of the organic solvent is 3-methyl-1,3,5-pentanetriol. The composition can also comprise from 1 wt % to 6 wt % of a dispersant-functionalized black carbon pigment, and from 0.1 wt % to 4 wt % of an ammonium salt.

Self-Dispersed Black Pigment

The self-dispersed black pigment can be a carbon pigment functionalized with a dispersant. The dispersant is typically prepared in a precursor form, and then the precursor is attached to the pigment to chemically modify the surface of the pigment. In one embodiment, the dispersant can be attached to the carbon black using various amino precursor materials, such as para-aminobenzoic acids, isophthalic acids, triacids, and isomers thereof, for example. Other precursors can also be used to attach to the carbon black, as would be known by those skilled in the art.

The carbon pigment can be almost any commercially available carbon pigment that provides acceptable optical density and print characteristics. Carbon pigments suitable for use in the present invention include, without limitation, carbon black, graphite, vitreous carbon, charcoal, and combinations thereof. In one aspect of the present invention, the carbon pigment is a carbon black pigment. Such carbon black pigments can be manufactured by a variety of known method such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, and CAB-O-JET 300; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V; and TIPURE R-101 available from Dupont.

Typically the carbon black pigments of the present invention can be from about 5 nm to about 10 μm and in one aspect can be from 10 nm to about 500 nm in size, although sizes outside this range can be used if the pigment can remain dispersed and provide adequate color properties. In one detailed aspect of the present invention, the functionalized carbon pigment comprises from about 1 wt % to about 6 wt % of the ink-jet ink composition.

Liquid Vehicle

The ink-jet ink compositions of the present invention are typically prepared using an aqueous formulation or liquid vehicle which can include water, co-solvents, surfactants, buffering agents, biocides, sequestering agents, viscosity modifiers, humectants, binders, and/or other known additives. Typically the ink-jet ink compositions of the present invention have a viscosity of between about 0.8 cps to about 15 cps, and in one embodiment, can be from about 0.8 cps to about 8 cps. In one aspect of the present invention, the liquid vehicle can comprise from about 70 wt % to about 99 wt % of the ink-jet ink composition.

Frequency response of a black pigmented ink-jet inks can be proportional to the printer system throughput ability. In ink-jet printing systems, it can be desirous to have a high upper frequency limit while maintaining a functional frequency bandwidth within a lower range. In the prior art, a typical and understood solution to increasing pen system frequency range, and upper frequency limits particularly, has involved designing jetting architecture to accommodate the requirements of a given ink. However, it has been discovered that certain co-solvents can be used in liquid vehicles which increase the range of frequency response for a given ink-jet architecture and ink-jet ink combination. Specifically, methylated pentanetriols, such as 3-methyl-1,3,5-pentanetriol, provide a means of achieving superior frequency response in self-dispersed black pigmented ink-jet inks. The improvement can be manifested by a reduction of misdirected ink drops upon ink-jet architecture firing, which improved nozzle directionality is particularly noted as the upper ink firing frequency limit is raised. Additionally, not only is better performance noted at these higher frequency levels, but the operational frequency bandwidth can also be expanded by the use of these co-solvents. For example, by increasing the upper frequency limit that can be used to jet a particular ink-jet ink, the effective range of frequency response of an ink can be increased. Thus, in one embodiment, a printhead can be configured to jet the black ink-jet ink of the present invention at a firing frequency from 15 kHz to 25 kHz, or even from 18 kHz to 25 kHz. Though a high frequency range is provided, these same inks can also be jetted at from 3 kHz to 15 kHz as well, which is more common amongst many of the inks currently available on the market. Thus, the frequency response range of these ink-jet inks can be quite broad.

In addition to the presence of the methylated pentanetriol co-solvents described above, other co-solvents can also be present. Suitable secondary co-solvents for use in the present invention include water soluble organic co-solvents, but are not limited to, aliphatic alcohols, aromatic alcohols, diols, glycol ethers, poly(glycol)ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, co-solvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol)alkyl ethers, higher homologs of poly(ethylene glycol)alkyl ethers, poly(propylene glycol)alkyl ethers, higher homologs of poly(propylene glycol)alkyl ethers, lactams, substituted formamides, unsubstituted formamides, substituted acetamides, and unsubstituted acetamides. Specific examples of co-solvents that are preferably employed in the practice of this invention include, but are not limited to, 1,5-pentanediol, 2-pyrrolidone, Liponic ethylene glycol 1 (LEG-1), Liponic ethylene glycol 7 (LEG-7), 2-methyl-2,4-pentanediol, 2-methyl-1,3-propanediol, 2-ethyl-2-hydroxymethyl-1,3-propanediol, diethylene glycol, 3-methoxybutanol, and 1,3-dimethyl-2-imidazolidinone. Co-solvents can be added to reduce the rate of evaporation of water in the ink to minimize clogging or other properties of the ink such as viscosity, pH, surface tension, optical density, and print quality. The co-solvent concentration can range from about 15 wt % to about 30 wt %. In one embodiment, when multiple co-solvents other than the methylated pentanetriol is used, each co-solvent is typically present at from about 1 wt % to about 10 wt % of the ink-jet ink composition. With respect to the methylated pentanetriols, they can be present in the ink-jet ink composition at from 3 wt % to 10 wt %.

Other additives, such as ammonium salts, can also be included, such as at from 0.1 wt % to 4 wt % in one embodiment. Examples of such ammonium salts include ammonium acetate and ammonium sulfate. If used, the presence of an ammonium salt can improve edge acuity and reduce bleed of printed images. Though the ammonium salt can be configured to be stable within ink-jet architecture prior to firing, it is believed that the presence of an ammonium salt (which includes an $NH_4^+$ group) can cause the ink as a whole to become destabilized on the print media after being jetted from the ink-jet architecture. By destabilized, the surface negative charges of the self-dispersed pigment particles can become agglomerated as the cation of the ammonium salt liberates a proton. In other words, the remaining $NH_3$ group can be liberated as a gas, and the positively charged proton is free to preferentially seek out the negative charge present around the pigment dispersion, thus, providing at least a degree of electrical neutralization.

Various buffering agents can also be optionally used in the ink-jet ink compositions of the present invention. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; and other basic or acidic components. If used, buffering agents typically comprise less than about 10 wt % of the ink-jet ink composition.

In another aspect of the present invention, various biocides can be used to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the ink-jet ink composition and often from about 0.05 wt % to about 2 wt %.

In an additional aspect of the present invention, binders can be included which act to secure the colorants on the substrate. Binders suitable for use in the present invention typically have a molecular weight of from about 100 to about 50,000 g/mol. Non-limiting examples include polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof. If the binder is in a particulate dispersed form, then it is not considered to be part of the liquid vehicle, but is considered to be carried by liquid vehicle.

In one aspect of the present invention, the ink-jet ink compositions are substantially free of surfactants. However, such components can be used and may include standard water-soluble surfactants such as alkyl polyethylene oxides, alkyl phenyl polyethylene oxides, polyethylene oxide (PEO) block copolymers, acetylenic PEO, PEO esters, PEO amines, PEO amides, and dimethicone copolyols. If used, surfactants can be present at from 0.001 wt % to 10 wt % of the ink-jet ink composition, and in one embodiment, can be present at from 0.001 wt % to 0.1 wt %.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what are presently deemed to be the most practical and preferred embodiments of the invention.

Example 1

A black pigmented ink-jet ink in accordance with the present invention (test) and a control ink-jet ink (control) were prepared using components within the ranges shown in Table 1. The components were combined to form a black ink having a pH of about 8.

TABLE 1

| Component | Control (wt %) | Test (wt %) |
|---|---|---|
| Ethoxylated glycerol | 1–10 | 1–10 |
| Alkyldiol | 1–10 | 1–10 |
| 2-pyrrolidinone | 1–10 | 1–10 |
| 2-methyl-2,4-pentanediol (hexylene glycol) | 0.5–5 | 0.5–5 |
| 2-methyl-1,3-propanediol | 1–10 | 1–10 |
| 3-methyl-1,3,5-pentanetriol | 0 | 3–10 |
| Surfynol 465 | 0.001–0.1 | 0.001–0.1 |
| Self-dispersed black pigment | 1–5 | 1–5 |
| Buffer | 0.1–0.5 | 0.1–0.5 |
| Ammonium acetate | 0.05–2 | 0.05–2 |
| Proxel GXL | 0.05–2 | 0.05–2 |
| Water | balance | balance |

Variations of the formulations (control ink and test ink) described in Table 1 above were tested in identical pen/printer/media systems for frequency response and misdirected firing. The pen used was an HP C6656AN, the paper used was Hewlett-Packard Plain Paper, and the printer used was an HP DJ5550. The only difference between the two formulations in each test was the addition of 3-methyl-1,3,5-pentanetriol. For example, in Table 1 above, the amount of total liquid organic solvent (excluding solids, biocide, surfactant, buffer, and salts) for each control ink prepared was from 14 wt % to 25 wt %, and the amount of total liquid organic solvent (excluding solids, biocide, surfactant, buffer, and salts) for each test ink prepared was from 15 wt % to 30 wt %. In other words, there was more total organic solvent present in the test ink compared to the control ink solely due to the presence of the 3-methyl-1,3,5-pentanetriol in the test ink.

After preparing both inks (control ink and test ink) for each comparison, a one page print diagnostic was conducted to discern print attribute differences. The diagnostic utilized was chosen to highlight nozzle performance across a range of firing frequencies. This observed range was from 3.0 kHz to 19.8 kHz. The diagnostic was designed to print a series of fired dots in a linear line. Deviation from the desired linearity was evident by observing overlapping adjacent dot rows. This overlap results in dark and light lines commonly referred to as banding or striping. Improvement in nozzle directionality was noted from 6.0 kHz to 19.8 kHz in the systems that included 3-methyl-1,3,5-pentanetriol when compared with the system that lacked this material.

A similar degree of improvement was not observed by simply increasing the total amount of organic solvent in the control ink, such as by increasing one of the other solvent amounts. In other words, a more drastic improvement was noted by adding 3-methyl-1,3,5-pentanetriol to the ink compared to increasing one of the other solvent amounts by the same amount and not adding the 3-methyl-1,3,5-pentanetriol.

Additionally, the presence of the ammonium salt contributed to reduced bleed and improved edge acuity.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. A system for printing images on a substrate, comprising:
   a) a black ink-jet ink including:
      i) a liquid vehicle including water, and from 15 wt % to 30 wt % organic solvent, wherein from 3 wt % to 10 wt % of the organic solvent is a methylated pentanetriol co-solvent, and
      ii) from 1 wt % to 6 wt % of a dispersant-functionalized black carbon pigment; and
   b) a printhead loaded with the black ink-jet ink which is configured to jet the black ink-jet ink at a firing frequency from 15 kHz to 25 kHz.

2. The system of claim 1, wherein the carbon pigment is from about 5 nm to about 10 μm in size.

3. The system of claim 1, wherein the liquid vehicle comprises from about 70 wt % to about 99 wt % of the black ink-jet ink.

4. The system of claim 1, wherein, in addition to the methylated pentanetriol, the organic solvent includes at least two other organic co-solvents, each being present at from about 1 wt % to about 10 wt %.

5. The system of claim 1, further comprising from 0.001 wt % to 0.1 wt % surfactant.

6. The system of claim 1, wherein the ink is surfactant free.

7. The system of claim 1, further comprising from 0.1 wt % to 4 wt % of an ammonium salt.

8. The system of claim 1, wherein the methylated pentanetriol is 3-methyl-1,3,5-pentanetriol.

9. The system of claim 1, wherein a dispersant precursor used to form the dispersant-functionalized black carbon pigment is an amino precursor selected from the group consisting of para-aminobenzoic acids, isophthalic acids, and triacids.

10. The system of claim 1, wherein the firing frequency is from 18 kHz to 25 kHz.

11. A method of rapidly printing a black ink-jet image, comprising ink-jetting a black ink-jet ink onto a media substrate at a firing frequency from 15 kHz to 25 kHz, said black ink-jet ink comprising:
   i) a liquid vehicle including water, and from 15 wt % to 30 wt % organic solvent, wherein from 3 wt % to 10 wt % of the organic solvent is a methylated pentanetriol co-solvent; and
   ii) from 1 wt % to 6 wt % of a dispersant-functionalized black carbon pigment.

12. The method of claim 11, wherein the carbon pigment is from about 5 nm to about 10 μm in size.

13. The method of claim 11, wherein the liquid vehicle comprises from about 70 wt % to about 99 wt % of the black ink-jet ink.

14. The method of claim 11, wherein, in addition to the methylated pentanetriol, the organic solvent includes at least two other organic co-solvents, each being present at from about 1 wt % to about 10 wt %.

15. The method of claim 11, further comprising from 0.001 wt % to 0.1 wt % surfactant.

16. The method of claim 11, wherein the ink is surfactant free.

17. The method of claim 11, further comprising from 0.1 wt % to 4 wt % of an ammonium salt.

18. The method of claim 11, wherein the methylated pentanetriol is 3-methyl-1,3,5-pentanetriol.

19. The method of claim 11, wherein a dispersant precursor used to form the dispersant-functionalized black carbon pigment is an amino precursor selected from the group consisting of para-aminobenzoic acids, isophthalic acids, and triacids.

20. The method of claim 11, wherein the firing frequency is from 18 kHz to 25 kHz.

21. An ink-jet ink composition, comprising a mixture of:
a) a liquid vehicle having from 15 wt % to 30 wt % organic solvent, wherein from 3 wt % to 10 wt % of the organic solvent is 3-methyl-1,3,5-pentanetriol;
b) from 1 wt % to 6 wt % of a dispersant-functionalized black carbon pigment; and
c) from 0.1 wt % to 4 wt % of an ammonium salt.

22. The composition of claim 21, wherein the carbon pigment is from about 5 nm to about 10 μm in size.

23. The composition of claim 21, wherein the liquid vehicle comprises from about 70 wt % to about 99 wt % of the ink-jet ink composition.

24. The composition of claim 1, wherein, in addition to the methylated pentanetriol, the organic solvent includes at least two other organic co-solvents, each being present at from about 1 wt % to about 10 wt %.

25. The composition of claim 21, further comprising from 0.001 wt % to 0.1 wt % surfactant.

26. The composition of claim 21, wherein the composition is surfactant free.

27. The composition of claim 21, wherein the dispersant-functionalized carbon black is formed using a dispersant precursor selected from the group consisting of para-aminobenzoic acids, isophthalic acids, and triacids.

* * * * *